(No Model.)
S. SCHWARZ.
DISINFECTING DEVICE.
No. 592,746. Patented Oct. 26, 1897.
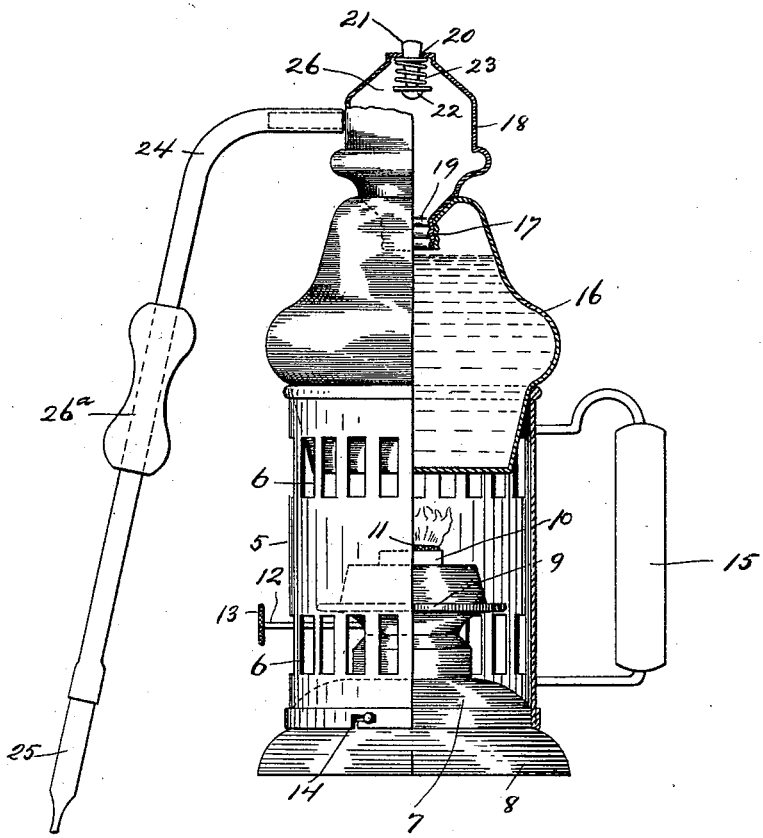
WITNESSES:
C. Nordfors
C. Gersh
INVENTOR
Samuel Schwarz.
BY
Edgar Tate & Co.
ATTORNEYS.
THE NORRIS PETERS CO., PHOTO-LITHO., WASHINGTON, D. C.

UNITED STATES PATENT OFFICE.

SAMUEL SCHWARZ, OF NEW YORK, N. Y., ASSIGNOR TO ROBERT SCHOBEL, OF SAME PLACE.

DISINFECTING DEVICE.

SPECIFICATION forming part of Letters Patent No. 592,746, dated October 26, 1897.

Application filed May 11, 1897. Serial No. 635,978. (No model.)

*To all whom it may concern:*

Be it known that I, SAMUEL SCHWARZ, a subject of the Emperor of Austria-Hungary, residing at New York, in the county of New York and State of New York, have invented certain new and useful Improvements in Disinfecting Devices, of which the following is a full and complete specification, such as will enable those skilled in the art to which it appertains to make and use the same.

This invention relates to disinfecting devices; and the object thereof is to provide an improved device of this class which is designed for use in disinfecting buildings or the various compartments thereof, and which may be also used for disinfecting closets, cupboards, and similar places and for destroying insects.

The invention is fully disclosed in the following specification, of which the accompanying drawing forms a part, said drawing being a sectional side elevation of my improved disinfecting device.

In the drawing forming part of this specification the separate parts of my improvement are designated by numerals of reference, and in the practice of my invention I provide a cylindrical casing 5, which is provided near the upper and lower ends thereof with slots or openings 6, any desired number of which may be employed, and I also provide a lamp which comprises a reservoir 7, which is provided with a base flange or rim 8 and a burner 9, through which the wick-tube 10 passes, and passing through the wick-tube 10 into the reservoir 7 is a wick 11, and passing through one side of the casing 5 is a wick-adjusting shaft 12, which is provided with a milled head or button 13, by which said shaft is operated.

The connection of the shaft 12 with the burner 9 and the wick-tube 10 is made in the usual manner and is therefore not shown and described, but said shaft passes through the casing 5 and may be operated without detaching the lamp therefrom, and the lamp-reservoir is connected with the lower end of said casing by a bayonet-joint, as shown at 14. The casing 5 is also provided at one side with a handle 15, and mounted in the upper end of said casing is a reservoir or receptacle 16, the lower end of which passes into the said casing 5, and is held therein by friction or may be secured therein in any desired manner.

The receptacle or reservoir 16 is provided at its upper end with an inwardly-directed screw-threaded tube 17, and connected with said reservoir or receptacle 16 is a casing 18, which is provided at its lower end with a screw-threaded tube 19, by means of which connection with the tube 17 of the receptacle of reservoir 16 is made, and the casing 18 is provided at the upper end thereof with an opening 20, through which passes a conical-shaped safety-valve 21, which is provided at its lower end with a disk or plate 22, and on which is mounted a spring 23, which holds said valve in the closed position, and said valve is operated by pressure from within, and when forced upwardly the opening 21 will be opened or partially opened, as will be readily understood. The casing 18 is also provided at one side thereof with a flexible tube 24, which is provided with a nozzle 25, and said tube is provided with a handle 26ª, which is adapted to slide thereon.

In practice the receptacle or reservoir 16 is filled with disinfecting chemicals, which are adapted to be vaporized by heat. The wick of the lamp is ignited and the heat produced thereby vaporizes the chemicals in the receptacle or reservoir 16 and the vapor passes through the flexible tube 24.

The device is carried by the handle 15 and may be used wherever necessary, the tube 24 being employed in order to direct the vapor to the points where the same is required, and the said vapor may be discharged in a room or compartment or in a closet, wardrobe, or cupboard, and by means of the nozzle 25 the vapor may be discharged into the cracks or crevices for the purpose of destroying insects, and this device may also be used for destroying insects on plants or shrubs and for similar purposes.

The safety-valve, which is connected with the casing 18, may be constructed in any desired manner, and the vapor passes from the receptacle or reservoir 16 directly into the chamber 26, formed by said casing 18.

This device is simple in construction and operation and perfectly adapted to accomplish the result for which it is intended, and it is also comparatively inexpensive and may be employed wherever disinfecting devices of this class are necessary.

Having fully described my invention, I claim as new and desire to secure by Letters Patent—

1. A disinfecting device consisting of a cylindrical casing provided with slots or openings in the upper and lower ends thereof, a lamp which is detachably connected with the lower end of said casing, and provided with a wick-adjusting shaft which projects through the side thereof, said casing being also provided with a reservoir or receptacle which is mounted in the upper end thereof, and which is provided at its upper end with a casing, the interior of which is in communication with the interior of said receptacle or reservoir, said casing being also provided with a safety-valve, and with a flexible tube, and said tube being provided with a nozzle and with a handle which is adapted to slide thereon, substantially as shown and described.

2. As an improved article of manufacture, a disinfecting device or insect-destroyer, consisting of a cylindrical casing provided with a handle and with slots or openings, and which is open at each end, a lamp adjustably connected with the lower end of said casing, and provided with a wick-adjusting shaft which projects through the side thereof, a reservoir or receptacle mounted in the upper end of said casing in the upper end of which is mounted a casing which is in communication with the interior of the said receptacle or reservoir, said last-named casing being provided at the top thereof with a safety-valve and at one side thereof with a flexible tube which is provided with a nozzle and which is also provided with a handle adapted to slide thereon, substantially as shown and described.

In testimony that I claim the foregoing as my invention I have signed my name, in presence of the subscribing witnesses, this 8th day of May, 1897.

SAMUEL SCHWARZ.

Witnesses:
C. GERST,
A. C. VAN BLARCOM.